(12) United States Patent
Cale et al.

(10) Patent No.: US 8,052,836 B2
(45) Date of Patent: Nov. 8, 2011

(54) LASER-BASED METHODS OF STRIPPING FIBER OPTIC CABLES

(75) Inventors: Andrew Stephen Cale, Conover, NC (US); Jeffrey Dean Danley, Hickory, NC (US); David Lee Dean, Jr., Hickory, NC (US); Terry Lee Cooke, Hickory, NC (US); Clyde Benton Mabry, III, Hickory, NC (US); Darrin Max Miller, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 73 days.

(21) Appl. No.: 12/324,253

(22) Filed: Nov. 26, 2008

(65) Prior Publication Data

US 2010/0126665 A1    May 27, 2010

(51) Int. Cl.
*B32B 38/10* (2006.01)
(52) U.S. Cl. ........ 156/712; 156/714; 156/753; 156/761; 156/923; 219/121.69; 219/121.77
(58) Field of Classification Search .................. 156/712, 156/714, 715, 716, 753, 761, 923; 219/121.67, 219/121.68, 121.69, 121.7, 121.71, 121.76, 219/121.77, 121.78, 121.79, 121.8
See application file for complete search history.

(56) References Cited

U.S. PATENT DOCUMENTS

| 6,509,547 | B1 | 1/2003 | Bernstein et al. | ........ 219/121.68 |
| 7,123,802 | B2 | 10/2006 | Engberg et al. | ................ 385/112 |
| 2002/0100552 | A1* | 8/2002 | McLeod | ........................ 156/344 |
| 2006/0089455 | A1 | 4/2006 | Sterin et al. | .................... 524/863 |

FOREIGN PATENT DOCUMENTS

WO    WO03/092890 A2    11/2003

* cited by examiner

*Primary Examiner* — Mark A Osele
*Assistant Examiner* — Nickolas Harm

(57) ABSTRACT

Laser-based methods of stripping different types of fiber optic cables (100) are disclosed. The method includes directing a focused laser beam (202) onto the cable's protective cover (114). The method also includes moving the fiber optic cable relative to the focused laser beam in a direction substantially along a central axis ($A_C$) to form a substantially axially oriented groove (250) in the protective cover, wherein the groove does not reach one or more optical fibers (110) carried by the cable. The method can further include opening the protective cover at the groove to form a split protective cover portion (114S), and removing the split protective cover portion from the fiber optic cable. Methods of stripping a cable by forming two grooves in the protective cover using two focused laser beams are also disclosed.

21 Claims, 9 Drawing Sheets

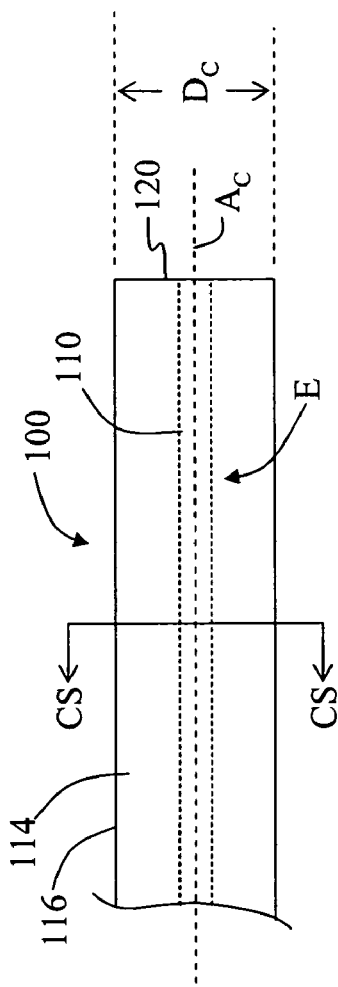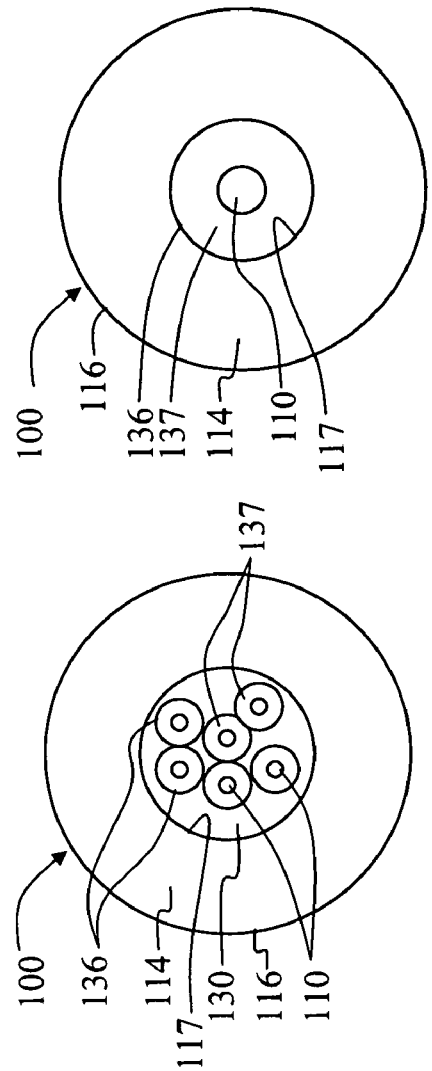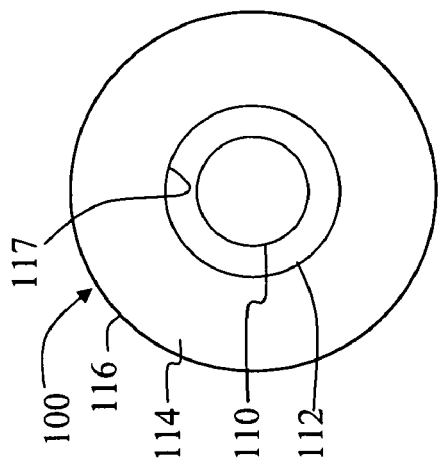

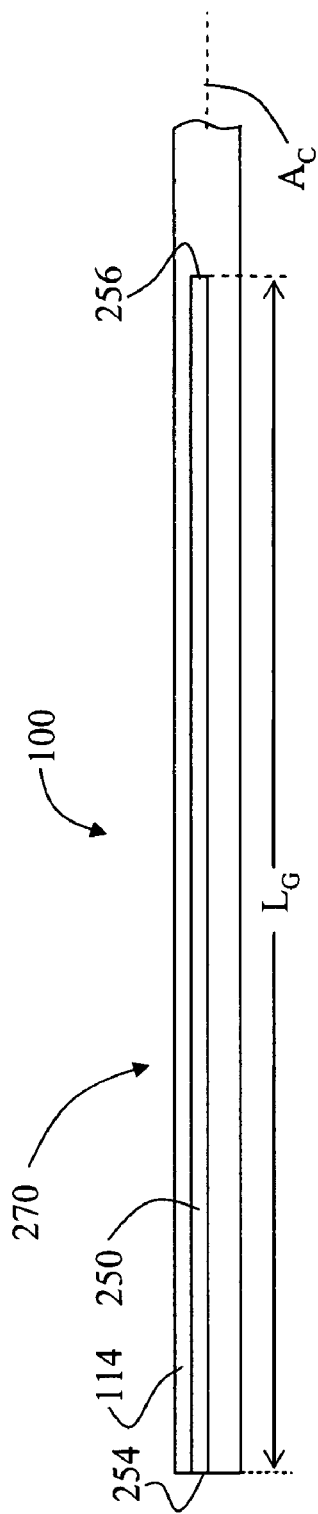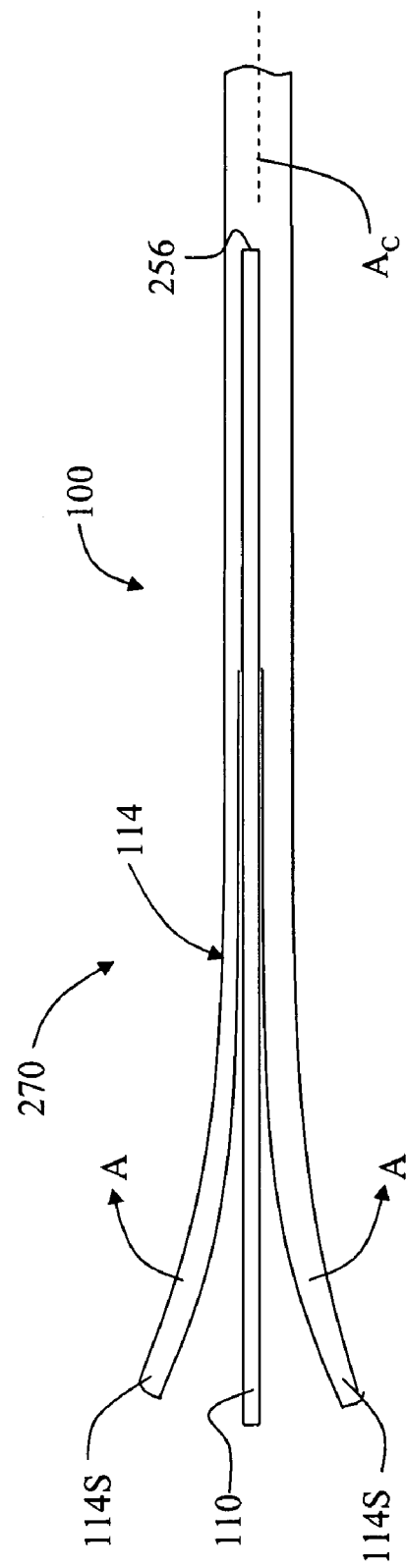
FIG. 10
FIG. 11

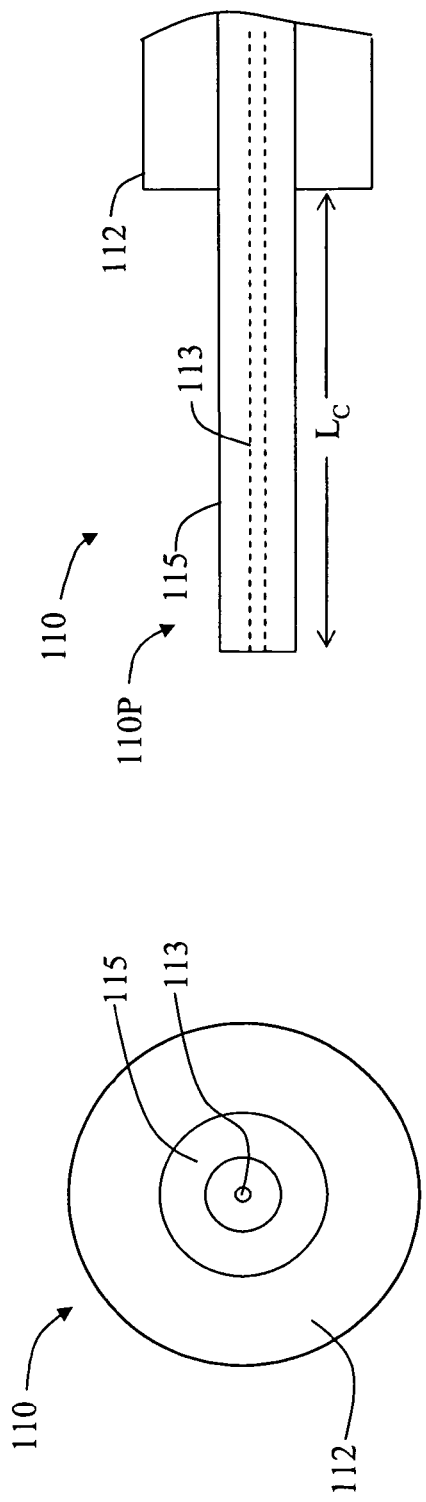
FIG. 16
FIG. 15
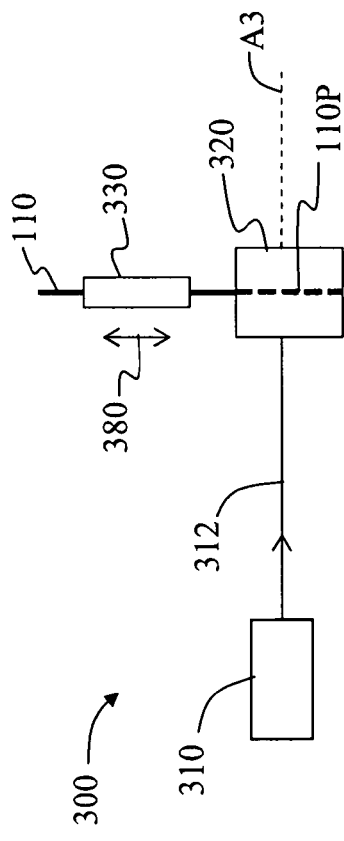
FIG. 17

LASER-BASED METHODS OF STRIPPING FIBER OPTIC CABLES

FIELD

The disclosure relates to fiber optic cables, and to laser-based methods of stripping the protective outer jacket from fiber optic cables.

BACKGROUND

Fiber optic cables are the backbone of optical fiber telecommunication networks. Multiple fiber optic cables are often included in a "harness," with the individual cables broken out at the end of the harness to connect to different locations.

Fiber optic cables used in harnesses can be classified into three main groups: tight-buffered cables, loose-tube cables, and single-tube cables. Tight-buffered cables are designed for indoor applications, have very good flexibility, and can be bent with a relatively small bend radius. One example tight-buffered cable uses a 125 μm diameter fiber with a low-friction acrylate layer that extends to an outside diameter of 250 μm. Next, a polymer buffer layer is added to the outside diameter of the low friction layer to form a protective cover that has an outside diameter of 900 μm.

Harness manufacturing using tight-buffered cables typically requires removing a 2 m section (length) of the protective cover without damaging or stressing the underlying acrylate layer or the glass fiber. Such damage can lead to optical transmission degradation (i.e., attenuation of the transmitted optical signal) or fiber breakage, either of which results in the harness failing to meet the required tolerances and having to be scrapped. More generally, fiber cable manufacturing and fiber cable installation requires stripping sections of the protective cover from the underlying elements, which include, by definition, at least one optical fiber, but may also include other elements such as buffer tubes, strength elements, etc., depending on the particular type of cable.

Presently, mechanical fiber optic cable stripping tools are predominantly used to strip sections of fiber optic cables. However, these stripping tools have significant drawbacks. One drawback is that they rely upon the skill and experience of the craftsperson to cut through the protective cover without damaging or stressing the elements within the cable, especially the one or more optical fibers. One of the most widely used stripping tools is limited to a 300 mm strip length, thereby requiring the craftsperson to make numerous circumferential cuts and strips to reach greater lengths, such as the aforementioned 2 m length. The need to make numerous cuts multiplies the risk of an error that can damage the cable. Another commonly used stripping tool employs a razor blade that needs proper adjustment and frequent replacement. Complicating matters further, damage to the underlying elements in the cable, such as an acrylate layer or the glass optical fiber, is not always visible to the naked eye and only becomes apparent later in the manufacturing process, or when the harness is deployed in the field.

SUMMARY

The disclosure provides for laser-based methods of stripping different types of fiber optic cables. The methods generally include directing a focused laser beam onto the cable's protective cover and moving the fiber optic cable relative to the focused laser beam in a direction substantially along the central axis to form a substantially axially oriented groove in the protective cover. In one example, the groove does not reach the one or more optical fibers carried by the cable. The method can further include opening the protective cover at the groove to form a split protective cover portion, and removing the split protective cover portion from the fiber optic cable. Methods of stripping a cable by forming two grooves in the protective cover using two focused laser beams are also disclosed.

BRIEF DESCRIPTION OF THE DRAWINGS

FIG. 1 is a schematic side view of an example fiber optic cable;

FIG. 2 is a cross-sectional view of an example tight-buffered cable as viewed along the direction CS-CS of FIG. 1;

FIG. 3 is a cross-sectional view of an example loose-buffered cable as viewed along the direction CS-CS of FIG. 1;

FIG. 4 is a cross-sectional view of an example single-tube cable as viewed along the direction CS-CS of FIG. 1;

FIG. 10 is similar to FIG. 9 and shows the cable terminated at the front end of the groove;

FIG. 11 is similar to FIG. 10 and shows the protective cover being peeled away from the coated fiber of a tight-buffered cable;

FIG. 15 is a cross-sectional view of an example optical fiber showing a central core, a surrounding cladding layer, and the coating layer surrounding the cladding;

FIG. 16 is a side view of an optical fiber showing an optical fiber end portion wherein a portion of the coating layer of length $L_C$ has been removed;

FIG. 17 is a schematic side view of an example laser-based system 300 used to remove a portion of the coating layer from the optical fiber.

DETAILED DESCRIPTION

Figure 5:
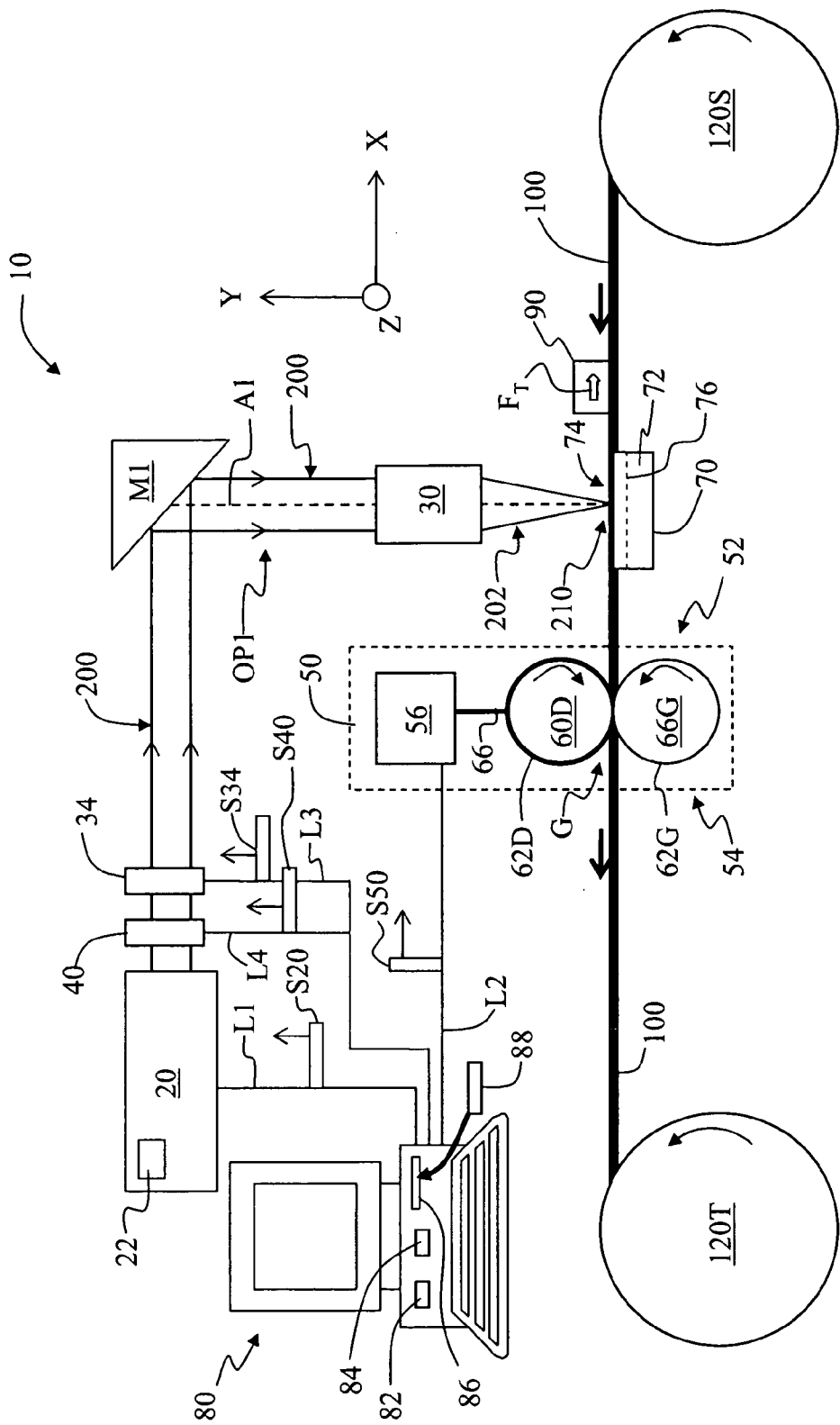
FIG. 5 is a schematic diagram of a laser-based cable stripping apparatus for carrying out the cable stripping methods of the present invention.

Reference is now made in detail to example embodiments of the disclosure, examples of which are illustrated in the accompanying drawings. Whenever possible, the same or like reference numbers and symbols are used throughout the drawings to refer to the same or like elements or components.

One aspect of the disclosure is a method of stripping a fiber optic cable having a protective cover with an outer surface that surrounds at least one optical fiber and that has a cable diameter ($D_C$) and a central axis. The method includes directing at least one focused laser beam onto the protective cover. The method further includes moving the fiber optic cable relative to the at least one focused laser beam in a direction substantially along the central axis to form at least one substantially axially oriented groove in the protective cover, wherein the at least one groove does not reach the at least one optical fiber. The method also includes opening the protective cover at the at least one groove to form at least one split protective cover portion. The method further includes removing the at least one split protective cover portion from the fiber optic cable.

Another aspect of the disclosure is a method of stripping a tight-buffered fiber optic cable having a protective cover with an outer surface and a central axis and that contains an optical fiber surrounded by a low-friction layer. The method includes moving a focused, infrared laser beam axially along a section of the protective cover of the fiber optic cable to form a substantially axial first groove in the protective cover. The first groove has a corresponding first bottom-most portion separated from the low-friction layer by a first thin portion of the protective outer cover. The method also includes breaking the first thin portion to form a first split protective cover section, and removing the first split protective cover section from the cable.

Another aspect of the disclosure is a method of stripping a portion of a protective cover from a fiber optic cable having an outside diameter ($D_C$), a central axis, and at least one optical fiber. The method includes forming first and second infrared laser beams having respective first and second spot sizes (SS1 and SS2). The method also includes moving the first and second focused laser beams over the protective cover relative to the fiber optic cable generally along the central axis and at a substantially different portion of the protective cover, to form corresponding first and second grooves in the protective cover. The first and second protective grooves do not reach the at least one optical fiber. The method also includes opening the protective cover at the first and second grooves to form first and second split protective cover sections. The method also includes peeling the first and second split protective cover sections away from the cable central axis.

Fiber Optic Cable Examples

FIG. 1 is a schematic diagram of an example fiber optic cable 100 that includes a central axis $A_C$, at least one optical fiber 110, and a protective cover 114 having an outer surface 116 and an inner surface 117. Protective cover 114 (also referred to in the art as a "buffer layer" or "buffer coating") surrounds the at least one optical fiber 110. Cable 100 is shown having an end 120 and an outer diameter $D_C$. The methods of the disclosure apply to any type of fiber optic cable that is amenable to stripping off at least a portion of protective cover 114 to expose underlying cable elements E (e.g., optical fibers, coated optical fibers, one or more buffer tubes, strength members, etc.), as discussed below. Such fiber optic cables 100 include the aforementioned tight-buffered cable, loose-buffered cable, or single-tube cable, as well as other types of cables. The discussion below sometimes refers to a fiber optic cable 100 in the form of a tight-buffered cable for ease of illustration and not by way of limitation.

FIG. 2 is a cross-sectional view of an example tight-buffered cable 100 as viewed along the direction CS-CS of FIG. 1. Tight-buffered cable 100 includes an optical fiber 110 immediately surrounded by a low-friction coating layer 112 such as acrylate. In an example embodiment, optical fiber 110 has a (nominal) diameter of 125 μm, coating layer 112 has a (nominal) outer diameter of 250 μm, and protective coating 114 has a (nominal) outer diameter $D_C$=900 μm.

FIG. 3 is a cross-sectional view of an example loose-buffered cable 100 as viewed along the direction CS-CS of FIG. 1. Cable 100 of FIG. 3 includes a central cavity 130 that is defined by protective cover 114 and contains one or more buffer tubes 136, each having an interior 137 that contains one or more optical fibers 110.

FIG. 4 is a cross-sectional view of an example single-tube cable 100, viewed along the direction CS-CS of FIG. 1, which includes a single buffer tube 136 wherein interior 137 contains one or more fibers 110. There are a number of different embodiments of cables 100 of FIG. 2 through FIG. 4 that include, for example, strength members, different cross-sectional shapes, etc., and one skilled in the art will understand that the cable examples shown herein are by way of illustration.

Laser-Based Cable Stripping Apparatus

FIG. 5 is a schematic diagram of a laser-based cable stripping apparatus 10 for carrying out the methods of the disclosure of stripping at least a section (i.e., a "length") of protective cover 114 from fiber optic cable 100. Cartesian X-Y-Z coordinates are shown for the sake of reference.

Apparatus 10 includes a laser 20 that generates a laser beam 200. In an example embodiment, laser 20 is an infrared (IR) laser such as a $CO_2$ laser that produces a (nominal) 10.6 μm wavelength laser beam 200. An example laser 20 is a Series 48 25W $CO_2$ laser from Synrad, Inc. of Mukilteo, Wash. In general, laser 20 can be any laser that generates light capable of forming a groove in protective cover 114, e.g., by melting or ablating the protective cover.

Apparatus 10 also includes a focusing optical system 30 arranged downstream of laser 20 along an axis A1 so receive laser beam 200 from the laser. In an example embodiment, focusing optical system 30 has a focal length f=2" (i.e., 50.8 mm). Focusing optical system 30 comprises one or more lens elements, one or more reflective mirrors, or a combination thereof In the case where laser 20 is an IR laser, focusing optical system comprises one or more IR-transmissive lens elements, one or more IR-reflective mirrors, or a combination thereof In an example embodiment, focusing optical system 30 forms, from laser beam 200, a laser spot 210 with a spot size (diameter) SS. In an example embodiment, spot size SS is about 125 μm based on a 6.5 mm diameter for laser beam 200, a focusing optical system 30 with f=2" (i.e., 50.87 mm), a laser beam wavelength of 10.6 um, and a laser mode parameter $M^2$=1.2. This spot size SS is roughly 15% of the diameter $D_C$ of the example tightly-buffered cable 100 discussed above. This allows for a relatively narrow, substantially axially oriented groove to be formed in protective cover 114, as described below. In an example embodiment, for a given cable 100, laser spot 210 has a spot size SS in the range as defined by the relationship SS<$D_C$, and more preferably in the range as defined by the relationship $(0.05)D_C \leq SS \leq (0.5) D_C$.

In an example embodiment, axis A1 is folded by a first fold mirror M1 arranged between laser 20 and focusing optical system 30 to create a folded optical path OP1. In an example embodiment, apparatus 10 includes a variable optical attenuator (VOA) 34 arranged in optical path OP1. Also in an example embodiment, apparatus 10 includes a shutter device 40 arranged in optical path OP1 that is used to selectively block laser beam 200 to selectively "turn on" and "turn off" the laser beam. In an example embodiment, shutter device 40 is internal to laser 20.

Apparatus 10 further includes a motor unit 50 having an input end 52, an output end 54, and a DC motor 56 that is mechanically attached to a drive wheel 60D via a drive shaft 66. Motor unit 50 also includes a guide wheel 60G arranged in substantially the same plane (e.g., the X-Y plane) and in opposition to drive wheel 60D, with a narrow gap G therebetween sized to accommodate cable 100 snugly between the drive and feed wheels. In an example embodiment, drive wheel 60D has a rubberized edge 62D that frictionally engages cable protective cover 114 at outer surface 116. Guide wheel 60G has an edge 62G configured (e.g., grooved) to accommodate a portion of cable 100 to guide the cable as it is propelled through gap G. Drive and guide wheels 60D and 60G counter-rotate as cable 100 is propelled (e.g., pulled) through gap G, as described below.

Figure 6:
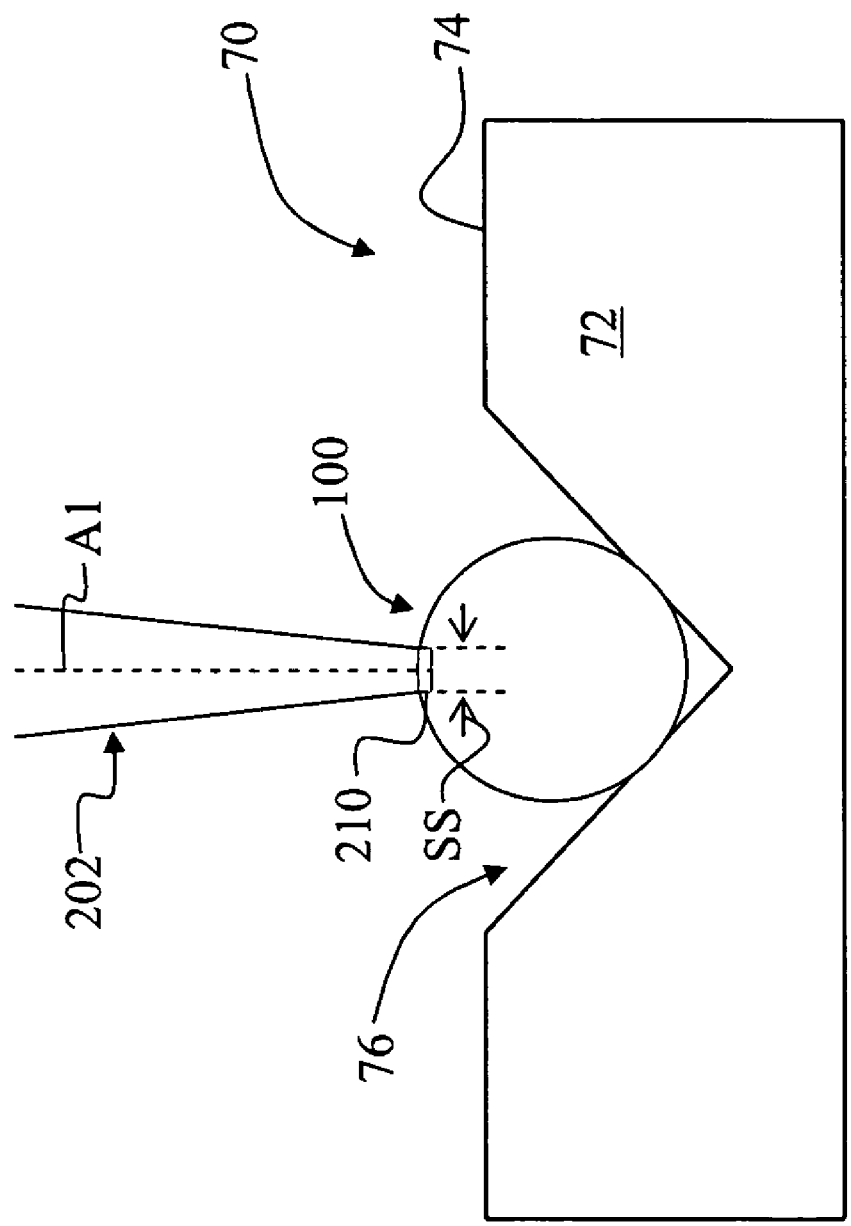
FIG. 6 is a close-up cross-sectional view of an example cable support member of the apparatus of FIG. 5.

In an example embodiment, apparatus 10 further includes a cable support member 70. FIG. 6 is a close-up cross-sectional view of an example cable support member 70, which includes a block-like body 72 having a top surface 74 with a groove 76 (e.g., a V-groove, as shown) formed therein. In an example embodiment, cable support member 70 is made of a ceramic material. In other example embodiments, cable support member 70 is made of aluminum or plastic. Groove 76 runs in the X-direction and, in an example embodiment, intersects optical path OP1 and axis A1 at a right angle.

Apparatus 10 further includes a controller 80 electrically connected to: laser 20 via an electrical line L1; motor unit 50 and DC motor 56 therein via an electrical line L2; VOA 34 via an electrical line L3; and shutter device 40 via an electrical line L4. Controller 80 is configured to control the operation of these devices to carry out the methods of the disclosure. In an example embodiment, controller 80 comprises a computer or like machine that is adapted (e.g., via instructions such as software embodied in a computer-readable or machine-readable medium) to control the operation of the various components of apparatus 10. In an example embodiment, controller 80 is or includes a computer with a processor 82 and includes an operating system such as Microsoft WINDOWS or LINUX. In an example embodiment, processor 82 is or includes any processor or device capable of executing a series of software instructions and includes, without limitation, a general- or special-purpose microprocessor, microcontroller, finite state machine, computer, central processing unit (CPU), field-programmable gate array (FPGA), or like devices. In an example embodiment, processor 82 is an Intel XEON, a PENTIUM, an AMD TURION, or another processor made by AMD Corp., Intel Corp. or other semiconductor processor manufacturer.

Controller 80 also preferably includes a memory unit ("memory") 84 operably coupled to processor 82. As used herein, the term "memory" refers to any processor-readable medium, including but not limited to RAM, ROM, EPROM, PROM, EEPROM, a disk, floppy disk, hard disk, CD-ROM, DVD, or like media, on which may be stored a series of instructions executable by processor 82. In an example embodiment, controller 80 includes a disk drive 86 adapted to accommodate a removable processor-readable medium 88, such as CD-ROM, DVE, a memory stick, or like storage medium.

Apparatus 10 further includes a tensioning member 90 that is arranged adjacent cable support member 70 and serves to provide tension to cable 100 by providing a tensioning force $F_T$ in the X-direction. In an example embodiment, tensioning member 90 is movable and manually adjustable so that it can be moved into position relative to cable 100 and cable support member 70 and adjusted prior to processing the cable in apparatus 10. In an example embodiment, tensioning member 90 comprises a spring arm that presses downwardly (i.e., in the −Y direction) on cable 100 to give rise to tensioning force $F_T$ (i.e., a tensioning force component in the X-direction).

Cable Stripping Method

To use apparatus 10 to carry out the cable stripping methods of the present disclosure, cable 100 first needs to be properly arranged in the apparatus. In an example embodiment, this include providing cable 100 on a storage spool 120S that is arranged relative to apparatus 10 and that can rotate freely to dispense the cable. Cable 100 is fed from storage spool 120S through groove 76 of cable support member 70 and through gap G between opposing drive and guide wheels 60D and 60G at motor unit input end 52. The snug fit of cable 100 between drive and guide wheels 60D and 60G ensures that the cable is pulled in the −X direction when the drive wheel is activated. Cable 100 is then collected as it exits motor unit 50 at output end 54, e.g., using a take-up spool 120T. In certain manufacturing operations, a take-up spool 120T is not used. Rather, an end portion of cable 100 of a desired length to be stripped is pulled through apparatus 10 and stripped as described below, and the cable is returned to storage spool 120S.

Once cable 100 is properly arranged in apparatus 10, controller 80 sends a control signal S20 to laser 20 to cause the laser to generate laser beam 200 along axis A1. In an alternative example embodiment, laser 20 is already activated and a control signal S40 is sent to shutter device 40 to "turn on" the laser beam, i.e., change the shutter device from "block" mode to "transmit" mode. In an example embodiment, laser 20 includes a laser controller 22 and control signal S20 is provided to the laser controller (shown as part of laser 20 for illustration).

Laser beam 200 passes through (optional) VOA 34, where it is selectively attenuated, and then reflects from fold mirror M1 (preferably at 90 degrees), after which it continues along folded axis A1 and optical path OP1 and through focusing optical system 30. Focusing optical system 30 serves to form from laser beam 200 a focused laser beam 202 that forms a spot 210 of spot size SS at cable surface 112. Control signal S20 is also used to control the amount of a power P in laser beam 200 to control the stripping process. In an example embodiment that includes VOA 34, controller 80 also sends a control signal S34 to the VOA to set the value of the attenuation to further control the amount of power in laser beam 200 by providing a select attenuation. In an example embodiment of the method, a Synrad Series-48 25W IR laser 20 was set at 28% output power, VOA 34 was not used, and the energy at laser beam spot 210 was measured to be 651 W/mm$^2$.

Tensioning member 90 is then put into position and adjusted to provide tensioning force $F_T$ to cable 100. Controller 100 also sends a control signal S50 to motor unit 50 and to DC motor 56 therein to initiate the operation of drive wheel 60D, which pulls cable 100 through groove 76 at a constant and select cable speed $V_C$. Cable speed $V_C$ and the power P in focused laser beam 202 define the amount of energy delivered to each irradiated point on protective cover 114.

Figure 7:
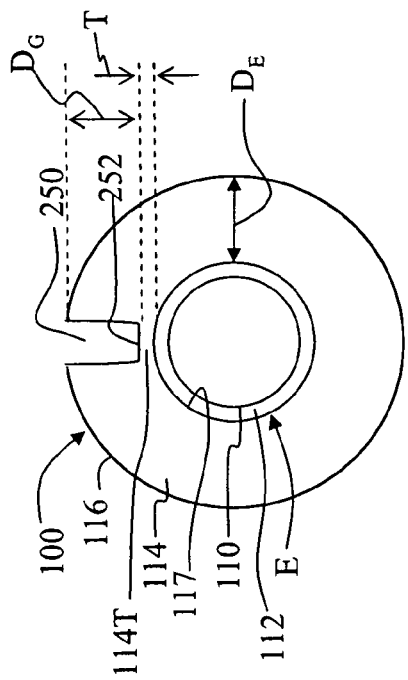
FIG. 7 is a cross-sectional view similar to FIG. 2, showing the cable being irradiated with a focused laser beam.
Figure 8:
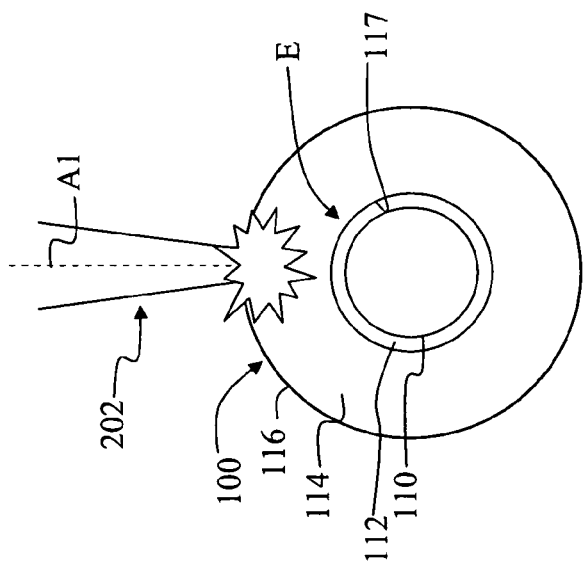
FIG. 8 is similar to FIG. 7 and shows the resulting channel formed by the focused laser beam.
Figure 9:
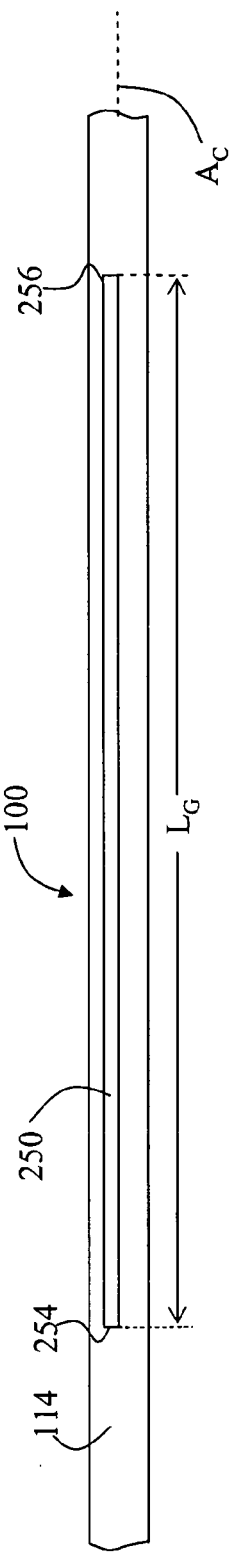
FIG. 9 is a plan view of a section of cable showing the groove formed therein.

With reference now also to FIG. 7 through FIG. 9, focused laser beam 202 ablates a portion of protective cover 114 as cable 100 is run through cable support member 70 and beneath the focused laser beam, thereby forming a groove 250 of a length $L_G$ in the protective cover. Groove 250 is substantially axially oriented, i.e., runs substantially along the length of cable 100 in the general direction of cable central axis $A_C$. In an example embodiment, controller 80 sends another control signal S40 to shutter device 40 to put the shutter device back into "block" mode, thereby blocking laser beam 200 and terminating the exposure. In an alternative example embodiment, another control signal S20 is sent to laser 20 to turn off the laser. In an example embodiment, groove 250 has front and back ends 254 and 256; here, the "front" end is where focused laser beam 202 is first turned on and first irradiates cable 100, and the back end is where the focused laser beam is shut off.

The matching of laser beam power P with cable speed $V_C$ is important because it is used to control a depth $D_G$ of groove 250, wherein the depth is defined by a bottom-most portion 252 of the groove. The amount of optical power P (in Watts) delivered to a given point on protective cover 114 is given by the energy E (Joules) of focused laser beam 202 multiplied by the amount of time ("dwell time," in seconds) the beam spends over the given point. In an example embodiment, the amount of power P provided is in the range from about 5 Watts to about 10 Watts, and in a more specific embodiment is about 8 Watts. In an example embodiment, a laser beam spot having a power/area ratio of 651 W/mm$^2$ was used in combination with a cable speed $V_C$ of 82.6 mm/s. In an example embodiment, the power per area can range from 325 W/mm$^2$ to 1301 W/mm$^2$ for cable speeds $V_C$ in the corresponding range from 41.3 mm/s to 165.2 mm/s.

With reference in particular to FIG. 7, in an example embodiment, groove 250 is formed so that bottom-most portion 252 does not reach fiber 110. In another example embodiment, groove 250 is formed so that bottom-most portion 252 does not reach protective cover inner surface 117. In an example embodiment, groove 250 is formed such that a thin portion 114T of protective cover 114 is left between groove bottom-most portion 252 and fiber 110. More generally, thin portion 114T is formed between groove bottom-most portion 252 and an element E that resides closer to protective cover outer surface 116 than fiber 110. For example, element E may not be fiber 110, but may be a buffer tube 136 (see FIG. 3 and FIG. 4) or low-friction coating layer 112. In this case, rather than fiber 110, element E is encountered when proceeding radially inward from protective cover outer surface 116.

In an example embodiment, thin portion 114T is formed between groove bottom-most portion 252 and protective cover inner surface 117. In an example embodiment, as illustrated by tight-buffered cable 100 of FIG. 2, protective cover inner surface 117 coincides with element E in the form of low-friction coating layer 112 that surrounds fiber 110. In a cable 100 where there is no element E in contact with protective cover inner surface 117 (e.g., the loose-tube cable of FIG. 3), groove 250 can be formed so that groove bottom-most portion 252 reaches the protective cover inner surface.

Thin portion 114T provides a safety margin for the laser-based groove cutting process, including accounting for possible variations in beam power P and/or cable speed $V_C$, or for an imprecise setting of one or both of these parameters relative to their optimal values for the given cable stripping application.

In an example embodiment, thin portion 114T has a thickness T of between about 50 μm to 100 μm. In another example embodiment, if distance $D_E$ is the distance between outermost element E and outer surface 116 of protective cover 114, then thickness T is in the range defined by the relationship $(0.05)D_E \leq T \leq (0.15)D_E$, and in an example embodiment is maintained at about $T=(0.1)D_E$.

Figure 12:
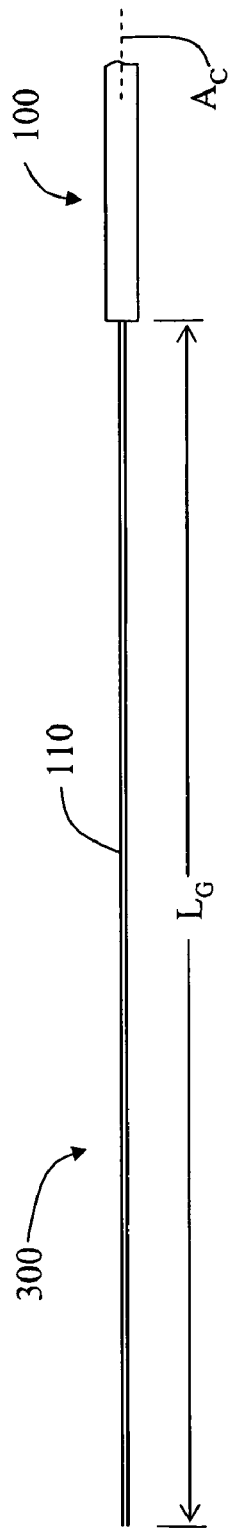
FIG. 12 is a perspective view of an example finalized stripped cable showing the stripped cable portion that reveals the underlying optical fiber.

Once groove 250 is formed in cable 100, then in an example embodiment, a craftsperson terminates the cable to form a cable end 101 at or near groove end 254, thereby forming a terminated, grooved end cable section 270, as illustrated in FIG. 10. The craftsperson then initiates the removal of protective cover 114 in end cable section 270 by opening the protective cover at groove 250. In an example embodiment, this involves breaking thin portion 114T. This forms a split protective cover portion 114S, which is then peeled away in a direction away from the cable central axis $A_C$ as indicated by arrows A, thereby forming a stripped section 300 of cable 100. At this point, split protective cover portion 114S is preferably cut away at groove end 256. In an example embodiment, stripped section 300 has a length $L_G$ as shown in FIG. 12. In an example embodiment, length $L_G$ is about 2 m.

Figure 13:
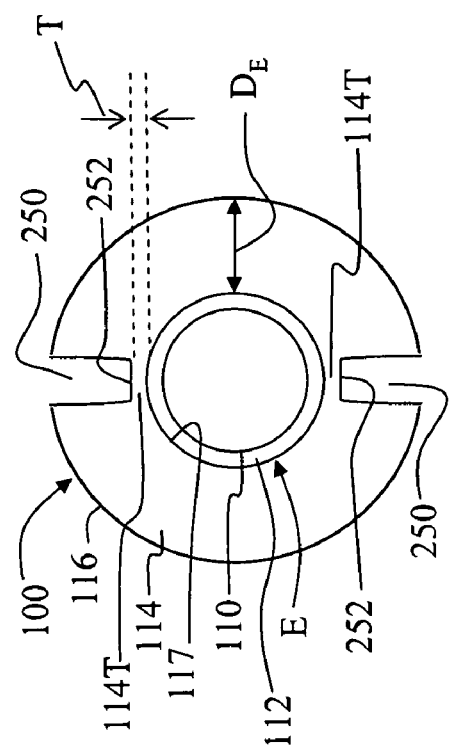
FIG. 13 is a cross-sectional view, similar to that of FIG. 2, illustrating an example embodiment where two grooves are formed in the protective cover of a tight-buffered cable.

FIG. 13 is a cross-sectional view of a processed cable 100 that illustrates an example embodiment wherein two grooves 250 are formed in the cable on substantially opposite sides of the cable. This makes protective cover 114 easier to strip compared to the single-groove case because the protective cover is split at two grooves 250 to form two split protective cover portions 114S.

The present disclosure contemplates any suitable method for "double grooving" cable 100. One method is to run cable 100 through apparatus 10 twice but with opposite sides of the cable exposed to focused laser beam 202. This method is effective, but it can be time consuming because of the need to reload the cable into apparatus 10, and the reloading time is typically much greater than the time spent forming groove 250.

Figure 14:
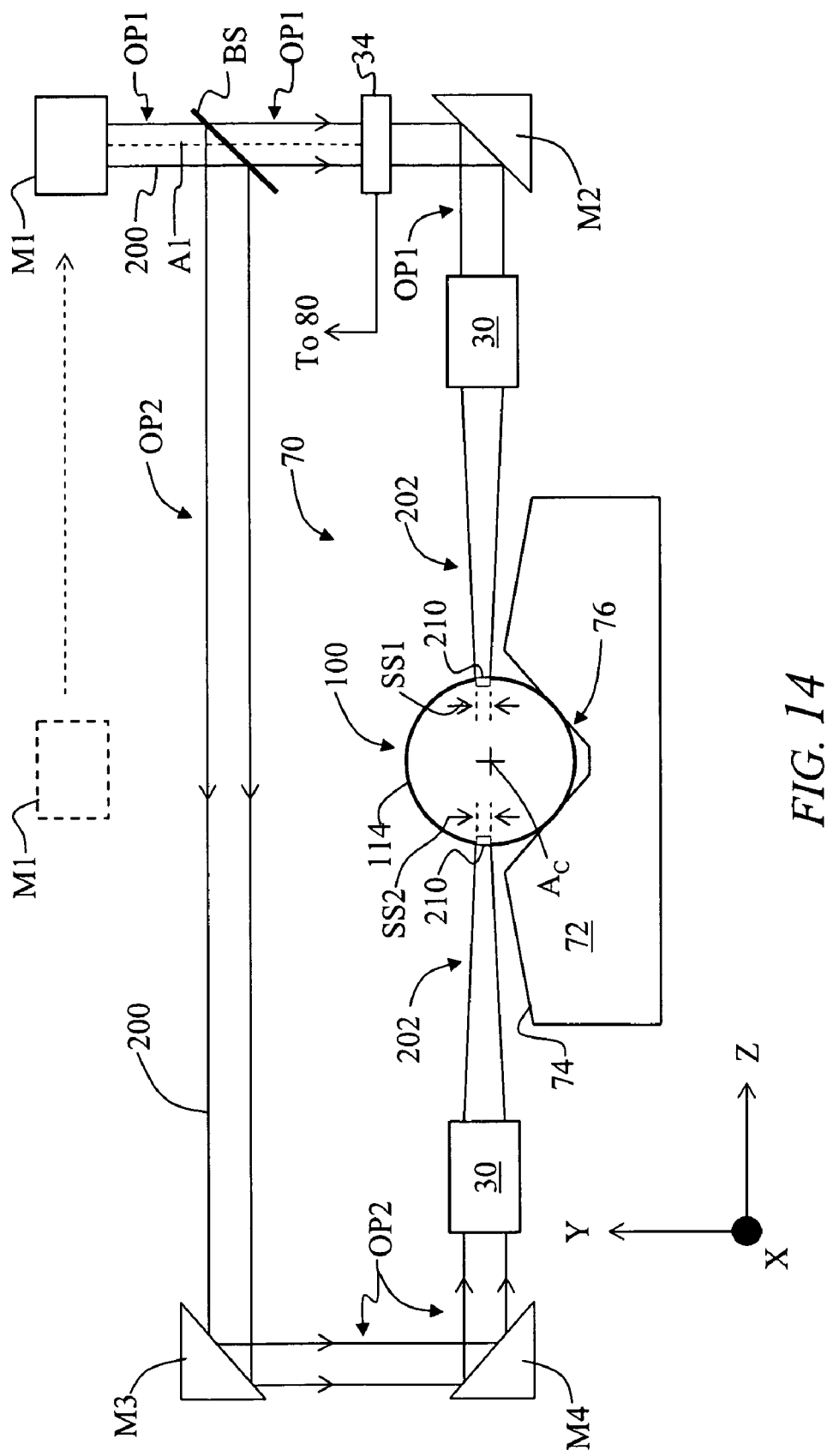
FIG. 14 is a close-up view of a modified portion of the apparatus of FIG. 5 in the area around the cable support member, wherein the modified apparatus forms two focused laser beams that irradiate the cable in both the +Z and −Z directions to form two grooves in the cable.

Another method of "double grooving" cable 100 uses a modified apparatus 10 that that provides two focused laser beams 202 that irradiate cable 10 from substantially opposite sides to simultaneously form two grooves 250 in protective cover 114. FIG. 14 is a close-up view of a modified portion of apparatus 10 around cable support member 70. Modified apparatus 10 is configured to form two laser beams 202 that irradiate cable 100 in the +Z and −Z directions. In this modified configuration, fold mirror M1 is moved in the +Z direction from its original position directly over cable support member 70 (as shown in phantom) to an offset position as shown. A beam splitter BS is disposed in laser beam 200 to split optical path OP1 into two optical paths, namely the original optical path OP1 and a new optical path OP2. The original optical path OP1 continues along the −Y direction to a first focusing optical system 30 via a second fold mirror M2. In an example embodiment, VOA 34 is positioned in optical path OP1 downstream of beam splitter BS to adjust the attenuation of beam 200 in optical path OP1 to correspond to that of optical path OP2.

Optical path OP2 is directed by beam splitter BS in the −Z direction to a third fold mirror M3, which redirects optical path OP2 in the −Y direction, and then to a fourth fold mirror M4, which redirects optical path OP2 in the +Z direction to a second focusing optical system 30. Cable 100 is thus irradiated with two focused laser beams 202 with respective spot sizes SS1 and SS2 from opposite directions as the cable moves through cable support member 70. In an example embodiment, spot sizes SS1 and SS2 can be substantially the same, and the respective powers of the two focused laser beams 202 can be substantially the same.

Apparatus 10 can be used in other embodiments. For example, apparatus 10 can be modified so that at least one focused laser beam 202 is scanned over the length of a stationary cable 100, e.g., by using a scanning mirror system.

Removing Coating Layer

Once cable 100 has a portion of its protective cover 114 removed to expose a portion of optical fiber 110, it is often necessary to remove a portion of coating layer 112 from the optical fiber to connectorize the optical fiber.

FIG. 15 is a cross-sectional view of an example optical fiber 110 showing a central core 113, a surrounding cladding layer ("cladding") 115, and coating layer 112 surrounding the cladding. In an example embodiment, optical fiber 110 has a (nominal) diameter of 125 µm and coating layer 112 has a (nominal) outer diameter of 250 µm. FIG. 16 is a side view of optical fiber 110 showing an optical fiber end portion 110P wherein a portion of coating layer 112 of length $L_C$ has been removed, thereby exposing the underlying cladding 115.

FIG. 17 is a schematic side view of an example laser-based system ("system") 300 used to remove a portion of coating layer 112 from optical fiber 110. System 300 includes a laser source 310 and an optical system 320 arranged downstream thereof along an axis A3. Laser source 310 emits an infrared laser beam 312, and in an example embodiment is a 10 Watt $CO_2$ laser that emits laser light at a wavelength of about 10.6 µm. Optical fiber 110 is held in a fiber holder 330 so that optical fiber end portion 110P extends into optical system 320. In an alternative example embodiment, a mid-span portion of optical fiber 110 is inserted into optical system 320. Optical system 320 is configured to receive laser beam 312 and direct it so that it irradiates front and back portions of optical fiber 110 with sufficient energy to ablate a select portion of coating 112.

Figure 18:
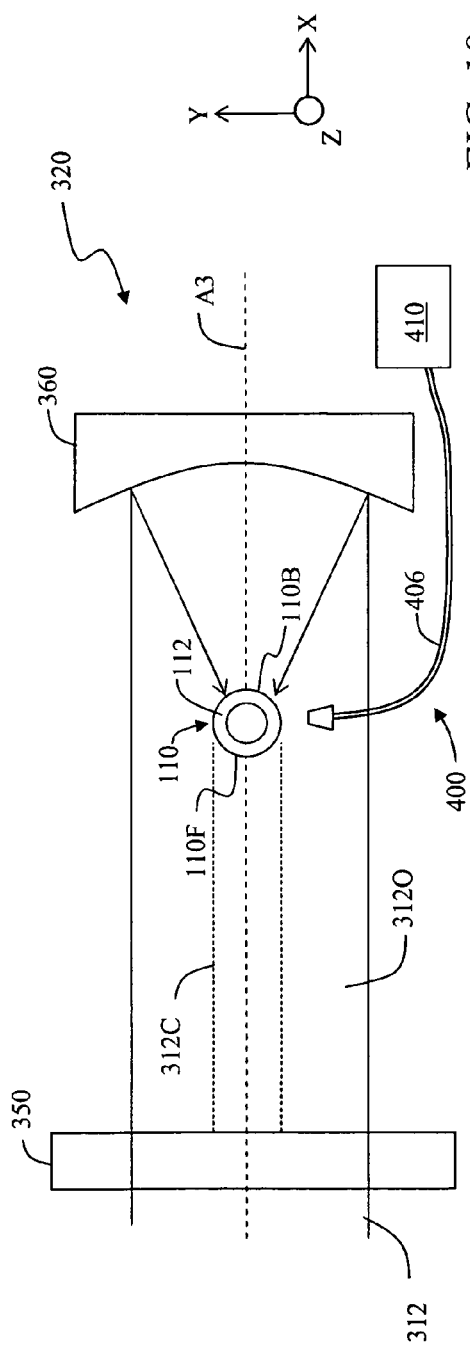
FIG. 18 and FIG. 19 are close-up schematic views from two different directions of an example anamorphic optical system for use in the laser-based system of FIG. 17.
Figure 19:
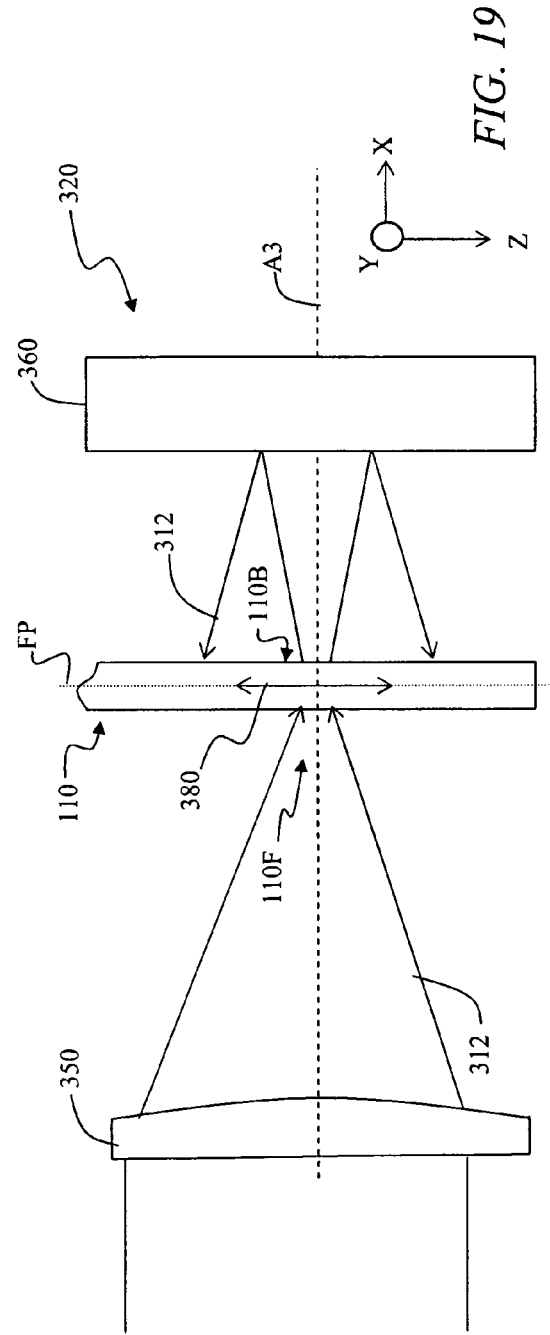

FIG. 18 and FIG. 19 are close-up schematic views from two different directions of an example anamorphic optical system 320 for use in system 300. Cartesian coordinates are shown for the sake of reference. Optical system 320 includes, along optical axis A3, a positive cylindrical lens 350 and a cylindrical concave mirror 360. Cylindrical lens 350 has power in the Z-direction, while cylindrical mirror 360 has power in the Y-direction. Optical fiber end portion 110P is disposed in between cylindrical lens 350 and concave mirror 360 and lies along the Z-direction. In an example embodiment, cylindrical lens 350 has a focal length of about 2.5" (i.e., about 64 mm) while cylindrical mirror 360 has a focal length of about 0.5" (i.e., about 12.7 mm). Optical system 320 could have other suitable characteristics. Cylindrical lens 350 and cylindrical mirror 360 are arranged so that their foci share a common Y-Z focal plane FP that intersects axis A3. Optical fiber 110 is arranged along the Y-direction in plane FP and intersects axis A3 so that the optical fiber is substantially at the respective foci of cylindrical lens 350 and cylindrical mirror 360.

With reference to FIG. 17 through FIG. 19, in the operation of system 300, laser beam 312 is received by optical system 320 and is directed to optical fiber 110. Specifically, laser beam 312 is focused by cylindrical lens 350 so that a central portion 312C of laser beam 312 is absorbed by a front portion 112F of coating layer 112 while the remaining outside portion 112O of the laser beam travels around optical fiber 110 to concave mirror 360. Outside laser beam portion 112O is reflected back and focused in the Y-direction by concave mirror 360 onto the optical fiber 110, where it is absorbed by a back portion 110B of coating layer 112. Note that the reflected beam 312 from concave mirror 360 is divergent in the Z-direction.

Both the incident and reflected laser beam portions are provided with sufficient power to ablate coating layer 112 while leaving the underlying cladding 115 and core 113 undamaged. In an example embodiment, the power density of focused beam 312 at optical fiber 110 is about 60 W/cm², and the length of the line focus is about 5 mm, but other settings are possible.

In an example embodiment, fiber holder 330 is configured to translate optical fiber 110 along the Z-direction (as indicated by double arrow 380) so that a select length $L_C$ of coating layer 112 can subjected to laser beam 312 and be removed by ablation. Note that because of the two-sided irradiation provided by optical system 320, optical fiber 110 need not be rotated to remove the portion of coating layer 112 around the entire circumference. In an example embodiment, length $L_C$ is on the order of 20 mm, which is a typical length associated with connectorizing an end of an optical fiber.

Also shown in FIG. 18 is a vacuum system 400 that includes a vacuum line 406 connected to a vacuum pump 410. Vacuum line 406 is arranged in proximity to optical fiber 110, and vacuum pump 410 provides a vacuum to the vacuum line to remove ablated coating layer material from the vicinity of optical fiber 110.

Advantages

The laser-based methods of cable stripping according to the disclosure have a number of advantages over present-day mechanical-based cable stripping methods. One advantage is that relatively long lengths of cable (e.g., 2 m) can be stripped without having to make multiple cuts or circumferential cuts. Another advantage is that the methods do not rely on the skill of a craftsperson. Another advantage is that the methods reduce the chances of damaging the cable during stripping and thereby reduce the amount of scrap generated by stressed, damaged or broken fibers. Yet another advantage is that the laser-based cable stripping methods of the disclosure are much faster than the predominant mechanical-based cable stripping methods.

Various modifications to the example embodiments of the disclosure can be made without departing from the spirit or scope of the invention in the appended claims. Thus, the disclosure covers modifications and variations provided they come within the scope of the appended claims and the equivalents thereto.

What is claimed:

1. A method of stripping a fiber optic cable having a central axis and a protective cover that surrounds at least one optical fiber, comprising:
   directing at least one focused laser beam onto the protective cover;
   moving the fiber optic cable relative to the at least one focused laser beam in a direction substantially along the central axis to form at least one substantially axially oriented groove in the protective cover;
   opening the protective cover at the at least one groove to form at least one split protective cover portion; and
   removing the at least one split protective cover portion from the fiber optic cable.

2. The method of claim 1, wherein:
   the at least one focused laser beam has a spot size (SS) equal to or less than a cable diameter ($D_C$).

3. The method according to of claim 2 wherein:
   the laser spot size SS is $(0.05)D_C \leq SS \leq (0.5)D_C$.

4. The method of claim 1, wherein:
   the at least one focused laser beam has an infrared wavelength.

5. The method of claim 1, wherein the at least one groove does not reach the at least one optical fiber.

6. The method of claim 5, wherein the other cable component element comprises a buffer tube that contains the at least one optical fiber.

7. The method of claim 1, wherein the fiber optic cable includes another cable component within the protective cover that resides closer to the protective cover than the at least one optical fiber, and further comprising:

forming the at least one groove so that it does not reach the other cable component.

8. The method of claim 7, wherein the other cable component is located at a distance $D_E$ from an outer surface of the protective cover, and the least one groove has a bottom-most portion that is separated from the other cable component by a protective cover portion having a thickness T of $(0.05)D_E \leq T \leq (0.15)D_E$.

9. The method of claim 1, wherein directing at least one focused laser beam comprises:
directing first and second focused laser beams to substantially opposite sides of the fiber optic cable to form first and second grooves.

10. The method of claim 1, wherein:
the fiber optic cable is selected from at least one of a tight-buffered cable, a loose-tube cable, a single-tube cable, or a combination thereof.

11. The method of claim 1, wherein moving the fiber optic cable relative to the at least one focused laser beam further comprises pulling the fiber optic cable under tension past the at least one focused beam.

12. The method of claim 1, wherein the protective cover has an inner surface, the laser beam has a power, the cable has a cable speed relative to the laser beam, and further comprising:
selecting the cable speed and laser power to remove a portion of the protective coating so that the at least one groove does not reach the protective cover inner surface.

13. The method of claim 1, wherein forming the at least one groove includes forming a corresponding bottom-most groove portion that does reach an inner surface of the protective cover.

14. A method of stripping a tight-buffered fiber optic cable having a protective cover—and a central axis and that contains an optical fiber, comprising:
moving a first focused, infrared laser beam axially along a section of the protective cover of the fiber optic cable to form a substantially axial first groove in the protective cover, wherein the first groove has a corresponding first bottom-most portion separated from a low-friction layer by a first thin portion of the protective outer cover;
breaking the first thin portion to form a first split protective cover section; and
removing the first split protective cover section from the cable.

15. The method of claim 14, further comprising:
moving a second focused, infrared laser beam axially along a section of the protective cover of the fiber optic cable to form a substantially axial second groove in the protective cover, the second groove has a corresponding second bottom-most portion separated from the low-friction layer by a second thin portion of the protective outer cover;
breaking the second thin portion to form a second split protective cover section; and
removing the first and second split protective cover sections from the cable.

16. The method of claim 14, further comprising:
forming the first focused laser beam to have a spot size (SS) equal to or less than an outer cable diameter ($D_C$) of the fiber optic cable.

17. The method of claim 16, further comprising:
forming the laser spot size (SS) defined by $(0.05)D_C \leq SS \leq (0.5)D_C$.

18. A method of stripping a portion of a protective cover from a fiber optic cable having an outside diameter ($D_C$), a central axis, and at least one optical fiber, comprising:
forming first and second infrared laser beams having respective first and second spot sizes;
moving the first and second focused laser beams over the protective cover, relative to the fiber optic cable, generally along the central axis and at a substantially different portion of the protective cover to form corresponding first and second grooves in the protective cover that do not reach the at least one optical fiber;
opening the protective cover at the first and second grooves to form first and second split protective cover sections; and
peeling the first and second split protective cover sections away from the cable central axis.

19. The method of claim 18, wherein the first and second spot sizes have substantially the same size.

20. The method of claim 18, wherein the fiber optic cable comprises a tight-buffered cable.

21. A method of ablating a coating of an optical fiber, comprising:
directing at least one laser beam at an optical fiber, a central portion of the laser beam being absorbed by a front portion of the optical fiber coating layer, a remaining portion of the laser beam traveling around the optical fiber to a mirror and being reflected back to a back portion of the coating layer of the optical fiber.

* * * * *